March 1, 1932.  R. D. ALLEMANG  1,847,325
DRIVING MECHANISM FOR LAUNDRY DRIERS
Filed June 28 1928   2 Sheets-Sheet 1

Inventor:
Raymond D. Allemang,
by Rippey & Kingsland
His Attorneys.

March 1, 1932. R. D. ALLEMANG 1,847,325
DRIVING MECHANISM FOR LAUNDRY DRIERS
Filed June 28, 1928   2 Sheets-Sheet 2
Fig. 2.
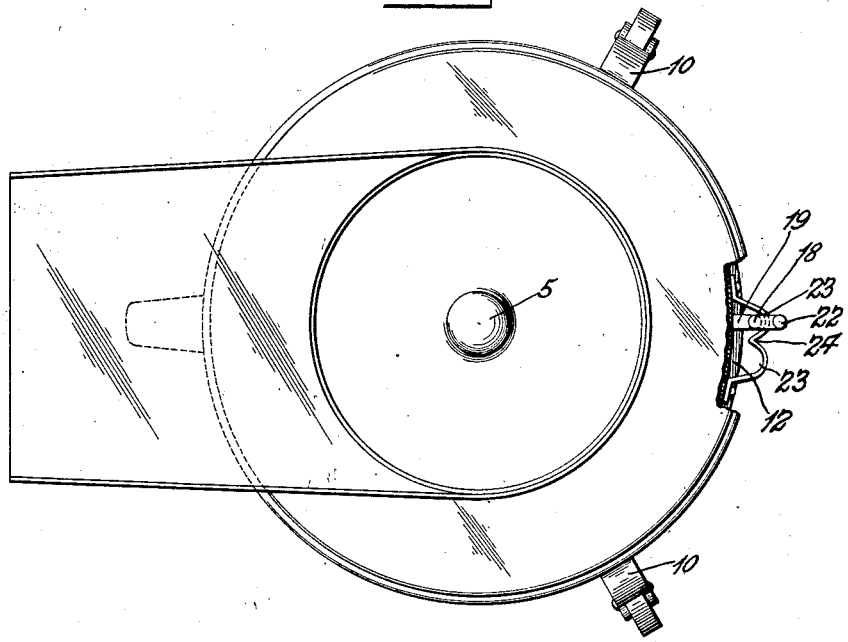
Fig. 3.
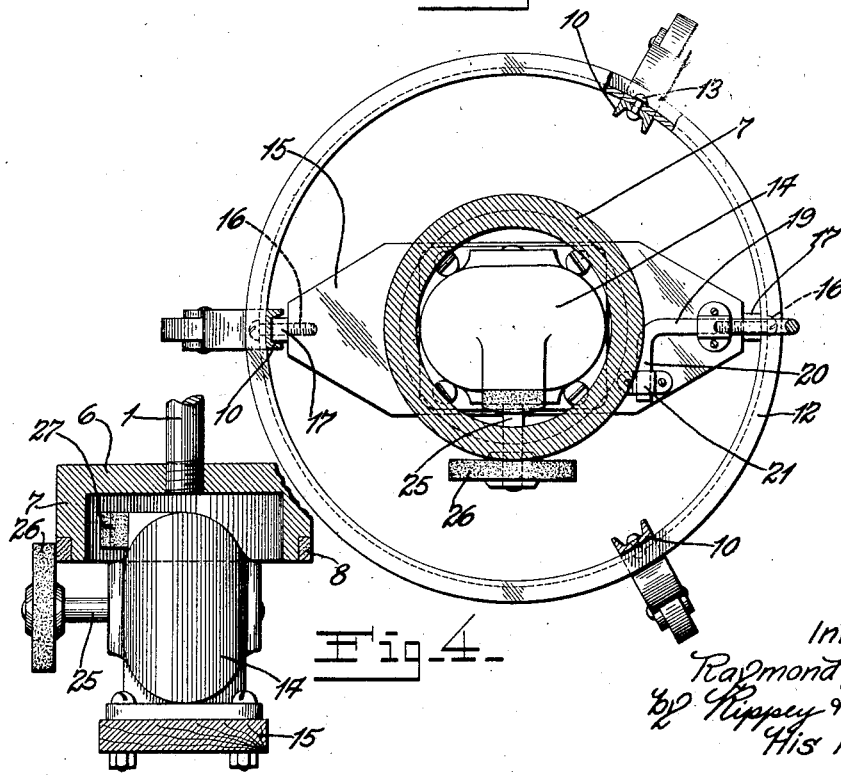
Fig. 4.
Inventor:
Raymond D. Allemang,
by Rippey & Kingsland.
His Attorneys.

Patented Mar. 1, 1932

1,847,325

UNITED STATES PATENT OFFICE

RAYMOND D. ALLEMANG, OF CLAYTON, MISSOURI

DRIVING MECHANISM FOR LAUNDRY DRIERS

Application filed June 28, 1928. Serial No. 289,063.

This invention relates to driving mechanism for laundry driers and the like, although the invention may be usefully applied to other purposes.

An object of the invention is to provide an improved driving mechanism in which the motor may be shifted to and from effective positions for operating the driven mechanism so that in one of said positions the motor has operative connection with a part of the driven mechanism, and in another position the motor is out of operative engagement with the driven mechanism.

Another object of the invention is to provide driving mechanism of the character and type mentioned wherein the motor is equipped with a brake or retarder for engaging a part of the driven mechanism when and as the motor is moved to inoperative position, and thus stop the driven mechanism by the motor.

Another object of the invention is to provide an improved device for moving the motor to and from and holding the same in, its different positions.

Other objects will appear from the following description, reference being made to the drawings in which Fig. 1 is a vertical sectional view of a laundry drier embodying the present invention.

Fig. 2 is a plan view, a part being broken away to show the motor shifting lever.

Fig. 3 is a sectional view on the line 3—3 of Fig. 1.

Fig. 4 is a sectional view of the motor support and a part of the driven mechanism showing the relationship of the motor thereto.

Figure 1:
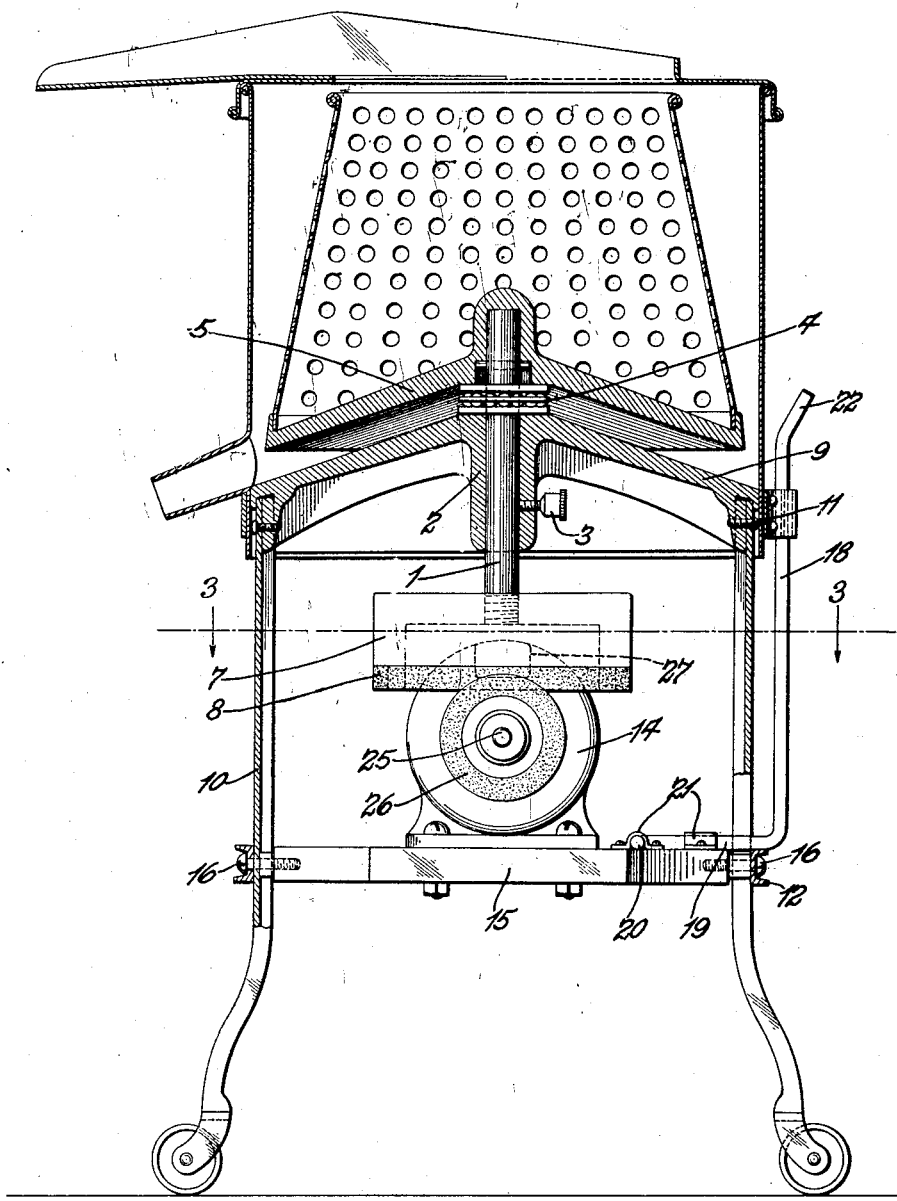

The vertical shaft 1 is journaled for rotation in a bearing 2 which is maintained in a lubricating condition by lubricant applied thereto through a grease cup or other lubricating device 3. The upper end of the shaft 1 is equipped with an anti-friction bearing 4 which may be utilized to support the shaft 1 within the bearing 2 and as a support for the driven member 5.

The lower end of the shaft 1 supports an inverted cup-like element comprising a plate 6 and a cylindrical flange 7 depending from the edge of the plate 6 and provided with a ring 8 around its lower end and being preferably non-metallic substance, such as bakelite.

The support 9 of which the bearing 2 is a part is supported by legs 10, preferably in the form of channel bars of appropriate shape, and having their upper ends fitted within recesses in the under side of the support 9 and secured thereto by fasteners 11. Additional rigidity for the legs 10 is obtained by a ring 12 encircling the series of legs and attached to the respective legs by fasteners 13. This ring 12 is preferably made of a channel bar bent to annular form and having its flanges extending outwardly (Fig. 1).

A motor 14 is mounted on a support 15. This support 15 has its ends mounted on pivots 16 extending radially through diametrically opposite portions of the ring 12 and through spacers 17 inside the ring 12. Rocking-movements are imparted to the support 15 and controlled by a device provided for that purpose. As shown, said device comprises a bar bent to form a vertically extended lever 18, an inwardly extended arm 19 and a laterally extended terminal 20. The parts 19 and 20 are seated upon one end of the support 15 and secured thereto by clips 21, while the lever 18 extends upwardly at the outside of the machine and is provided with a handle portion 22. This lever 18 is resilient and extends through a bracket made of a strap bent to provide two spaced seats 23 separated by a pointed portion 24. The lever 18 may be shifted from one of the seats 23 to the other, said lever being sprung during such movement so as to pass from one side to the other of the pointed portion 24. Due to the inherent strength of the lever 18 it will be retained in the notch 23 in which it is placed and will not yield to the weight of the motor, but may only be shifted manually when it is desired to shift the motor to and from operative position.

The shaft 25 of the motor has a wheel 26 attached thereto which, in one position of the motor, has one side of the peripheral portion thereof engaging the ring 8 with sufficient pressure to rotate said ring and thereby the remaining driven mechanism. This adjustment of the motor is obtained by shifting the lever 18 from one of the notches 23 to the other and disengagement of the wheel 26 from the driven mechanism is effected by reverse shift of the lever 18.

The motor is equipped with a brake device to stop operation of the driven mechanism automatically and as an incident to shifting of the motor to inoperative position. This brake device comprises a block 27 attached to the motor frame and arranged to engage the inner periphery of the ring 7 when the motor is shifted to inoperative position. The wheel 26 and the block 27 may be of appropriate nonmetallic material, such as bakelite.

From the foregoing it is apparent that it is only necessary to operate the lever 18 in order to shift the motor to and from operative positions; and that automatically and as an incident to the movement of the motor from operative position to ineffective position the brake device is brought into service to stop momentum operation of the driven mechanism.

The construction, arrangement and relationship of the parts may be varied widely within equivalent limits without departure from the nature and principle thereof. I do not restrict myself unessentially, but what I claim and desire to secure by Letters Patent is:—

1. Driving mechanism comprising an element to be rotated, a motor, a device for rotating said element by said motor, a pivoted support for said motor, a resilient lever attached to said support, a bracket having notches therein for receiving said lever, and means for shifting said lever from one of said notches to another and thereby oscillating said pivoted support to disengage said device from said element.

2. Driving mechanism comprising an element to be rotated, a motor, a device for rotating said element by said motor, a pivoted support for said motor, a resilient lever attached to said support, a bracket having notches therein for receiving said lever, means for shifting said lever from one of said notches to another and thereby oscillating said pivoted support to disengage said device from said element, and a brake supported by said motor for engaging said element when said device is disengaged therefrom as aforesaid.

3. Driving mechanism of the character described comprising a supporting frame, a vertical bearing supported approximately at the center of the upper end of said frame, a vertical shaft journalled for rotation in and extending below said bearing, a circular element attached to the lower end of and coaxial with said shaft, a downwardly extended cylindrical flange rigid with said circular element, a horizontal support pivoted for rocking movements in said frame below said circular element, a motor attached to said support, a shaft projecting from said motor approximately at right angles to said first shaft and being rotated by said motor, a wheel attached to said second shaft, and mechanism for shifting said support to position in which said wheel is in engagement with said flange and to position in which said wheel is out of engagement with said flange.

4. Driving mechanism of the character described comprising a supporting frame, a vertical bearing supported approximately at the center of the upper end of said frame, a vertical shaft journalled for rotation in said bearing, a circular element attached to the lower end of said shaft below said bearing, a downwardly extended cylindrical flange rigid with said element, a pair of axially alined pivot members supported by said frame, a horizontal support mounted for rocking movements on said pivot members below said circular element, a motor attached to said support, a shaft rotated by said motor, a wheel attached to said shaft, and mechanism for rocking said support to position in which said wheel is in engagement with said circular element flange and to position in which said wheel is out of engagement with said flange.

5. Driving mechanism of the character described comprising a supporting frame, a vertical bearing supported approximately at the center of the upper end of said frame, a vertical shaft journalled for rotation in said bearing, a circular element attached to the lower end of said shaft below said bearing, a downwardly extended cylindrical flange rigid with said element, a pair of axially alined pivot members supported by said frame, a horizontal support mounted for rocking movements on said pivot members below said circular element, a motor attached to said support, a shaft rotated by said motor, a wheel attached to said shaft, a lever attached to said support for rocking said support to position in which said wheel is in engagement with said flange and to position in which said wheel is out of engagement with said flange, and a device supported by said frame and engaging said lever to hold said lever in position to prevent accidental movement of said support.

6. Driving mechanism of the character described comprising a supporting frame, a vertical bearing supported approximately at the center of the upper end of said frame, a strengthening element attached to said frame intermediate of its upper and lower ends, a shaft journalled for rotation in and extending below said bearing, a circular element attached to the lower end of said shaft, a downwardly extended cylindrical flange rigid with said element, axially alined pivots supported by said strengthening element, a horizontal support mounted for rocking movements on said pivots, a motor attached to said support, a shaft rotated by said motor about an axis approximately at right angles to the axis of said circular element, and means for turning said support to position in which said wheel engages said flange and to position in which said wheel is out of engagement with said flange.

7. Driving mechanism of the character described comprising a supporting frame, a vertical bearing supported approximately at the center of the upper end of said frame, a strengthening element attached to said frame intermediate of its upper and lower ends, a shaft journalled for rotation in and extending below said bearing, a circular element attached to the lower end of said shaft, axially alined pivots supported by said strengthening element, a horizontal support mounted for rocking movements on said pivots, a motor attached to said support, a shaft rotated by said motor about an axis approximately at right angles to the axis of said circular element, means for turning said support to position in which said wheel engages said circular element and to position in which said wheel is out of engagement with said circular element, a brake movable into engagement with said circular element automatically and as an incident to the movement of said support to position in which said wheel is out of engagement with said circular element, and means for preventing accidental movement of said support from said last named position.

RAYMOND D. ALLEMANG.